United States Patent [19]
Levine et al.

[11] Patent Number: 6,067,644
[45] Date of Patent: May 23, 2000

[54] SYSTEM AND METHOD MONITORING INSTRUCTION PROGRESS WITHIN A PROCESSOR

[75] Inventors: Frank Eliot Levine, Austin; Roy Stuart Moore, Pflugerville; Charles Philip Roth; Edward Hugh Welbon, both of Austin, all of Tex.

[73] Assignee: International Business Machines Corporation, Armonk, N.Y.

[21] Appl. No.: 09/059,736

[22] Filed: Apr. 15, 1998

[51] Int. Cl.[7] .................................................. G06F 11/00
[52] U.S. Cl. ............................ 714/47; 714/39; 712/227
[58] Field of Search ................................ 714/39, 47, 49, 714/50, 51; 712/227, 32, 203, 245

[56] References Cited

U.S. PATENT DOCUMENTS

| | | | |
|---|---|---|---|
| 5,404,473 | 4/1995 | Papworth et al. | 395/375 |
| 5,446,876 | 8/1995 | Levine et al. | 714/47 |
| 5,481,683 | 1/1996 | Karim | 712/227 |
| 5,513,363 | 4/1996 | Kumar et al. | 395/800 |
| 5,537,541 | 7/1996 | Wibecan | 714/45 |
| 5,557,548 | 9/1996 | Gover et al. | 364/551.01 |
| 5,560,028 | 9/1996 | Sachs et al. | 395/800 |
| 5,590,351 | 12/1996 | Sowadsky et al. | 395/800 |
| 5,594,864 | 1/1997 | Trauben | 395/183.15 |
| 5,657,253 | 8/1997 | Dreyer et al. | 364/551.01 |
| 5,832,511 | 11/1998 | Beck et al. | 712/227 |
| 5,835,702 | 11/1998 | Levine et al. | 714/39 |
| 5,987,598 | 11/1999 | Levine et al. | 712/227 |

*Primary Examiner*—Robert W. Beausoliel, Jr.
*Assistant Examiner*—Pierre E. Elisca
*Attorney, Agent, or Firm*—Kelly K. Kordzik; Winstead Sechrest & Minick P.C.; Anthony V. S. England

[57] ABSTRACT

A processor operable for processing an instruction through a plurality of internal stages will produce a result of the processing of the process at each stage or a reason code why the stage was unable to process the instruction. The result or the reason code will then be passed to a subsequent stage, which will attempt to process the instruction. The second stage will forward the reason code when it cannot produce its own result and it is idle. The second stage will create its own reason code when it is not idle but cannot produce a result, and will forward this reason code.

14 Claims, 7 Drawing Sheets

| BITS 0-4 COUNTING ENABLES | BIT 5 INTERRUPT ENABLES | BITS 6-15 | BIT 16 PMC1 INTERRUPT CONTROL | BIT 17 PMCn, n>1 COUNT CONTROL | BIT 18 PMCn, n>1 COUNT CONTROL | BITS 19-25 PMC1 EVENT SELECTION | BITS 26-31 PMC2 EVENT SELECTION |

MMCR0

FIG. 6B

| BITS 0-4 PMC3 EVENT SELECTION | BITS 5-9 PMC4 EVENT SELECTION | BITS 10-14 PMC5 EVENT SELECTION | BITS 15-19 PMC6 EVENT SELECTION | BITS 20-24 PMC7 EVENT SELECTION | BITS 25-28 PMC8 EVENT SELECTION | BIT 29 FCUIABR | BIT 30 UPDATING MODE PMC1 | BIT 31 UPDATING MODE PMCn, n>1 |

MMCR1

SYSTEM AND METHOD MONITORING INSTRUCTION PROGRESS WITHIN A PROCESSOR

TECHNICAL FIELD

The present invention applies to general data processing systems, and in particular, to performance monitoring within such data processing systems.

BACKGROUND INFORMATION

In typical computer systems, optimization of software execution results in more effective system design by providing higher system performance. Memory system usage is an area that can provide significant opportunities for improvement. Careful investigation of memory hierarchy traffic has proven to reveal details of system behavior that can aid in the development of higher performing software algorithms. Performance monitors are useful in such investigations but existing performance monitors have shortcomings for such purposes.

A performance monitor is a facility incorporated into a computer system used to monitor selected internal characteristics affecting the rate at which the computer system does useful work. When properly configured, a performance monitor provides the internal state of a computer system at particular points in time. This means of measurement provides insights that are otherwise difficult to come by.

Performance monitors are important in that they expose the underlying details of the hardware normally hidden by abstract interfaces. In striving for software portability, it is desirable that abstracted interfaces be presented to software to free the software from dealing with system details. This act of abstraction, so valuable in promoting portability, obscures certain system states critical in providing optimal performance.

Typically, a performance monitor produces implementation dependent information relating to the processor's instruction execution control and storage control. Enhancements to the performance monitor provide critical information regarding the cost in terms of time required to retrieve data from a computer system memory. Such information guides system architects toward ways of enhancing performance of a given system or for developing improvements in the design of a new system.

Because of the hierarchical nature of memory systems, the time required to retrieve data from memory is not constant; measuring these timings requires special consideration of the details of computer memory structures. In most software, some data is frequently used while other data is seldom used. Most computer memory systems take advantage of this fact by incorporating small staging areas. These staging areas store frequently used data. Such areas are usually smaller and more rapidly accessed than system memory. This allows systems to complete work faster and thus have higher performance. Similarly, some items held in the staging areas are more frequently used than others. This leads to the use of an additional secondary staging area. If the required datum is not in the first staging area, the second staging area is next checked. If the item is not in the second staging area, system memory is checked. Because of the high probability of finding a required datum in some staging area, the average time to retrieve the datum is typically lower in hierarchically configured memory systems. Consequently, current memory systems are structured as hierarchies of staging areas where the staging areas become larger and slower in order of access.

It is clearly desirable to keep the most frequently reused data in the staging areas (hereinafter referred to as "caches") closest to point of usage. The degree to which this is achieved is crucial to system performance, since it affects the average time to access the data. This aspect of the memory hierarchy can be quantified by considering the likelihood that a given datum will not be found in a particular point in the cache. An access in which the required datum is "missing" from the cache is called a "cache miss." The ratio of cache misses to cache access is called the "cache miss ratio." Accompanying the cache miss ratio is the amount of time required to obtain the missing datum. The hierarchical cache levels are accessed sequentially. The first caches are usually the fastest but also the least capacious. Each subsequent cache is larger in capacity but slower to access. A metric that allows the measurement of the cost of accessing a given datum is defined by considering the order in which the caches are accessed. The caches accessed first are considered the closest in that they require the least amount of time to access. Caches subsequently accessed are correspondingly considered more distant than those accessed first. So the time required to access a needed datum depends on how distant the datum is in terms of the number of caches that must be accessed to obtain the datum.

In computers with hierarchical memory systems, the actual location of a needed datum is time dependent and essentially unpredictable; consequently the time to obtain a given datum is variable. The standard method used to evaluate the cost of a cache miss considers both the number of cache misses and the total duration of time (in cycles) for each cache miss. Because of the highly concurrent execution hardware employed in current computer systems, this approach does not provide a correct view of the effect because concurrent computer systems allow a substantial degree of out-of-order execution. Often the time needed to access a datum has less than expected impact on forward progress. This is because other useful work can be done while a given datum is accessed so forward progress may be occurring in a variety of units. Therefore, counting the number of cycles in which cache misses are in process does not accurately reflect the cost of the cache miss, since other units may be making forward progress. Therefore, simply counting events does not give a full picture of the state of the machine. This situation is not unique to the retrieval of memory data; there are similar situations when time-consuming calculations impede forward progress. For these and similar reasons that will be apparent to individuals skilled in the art, it is desirable to provide an improved method and system for performance monitoring that supplies additional information regarding the causes and effects of event occurrences within a data processing system.

SUMMARY OF THE INVENTION

The present invention addresses the foregoing need by providing for each execution unit within a processor at each cycle, the ability to produce either a result or what will be termed a "reason code" along with an indicator as to which was produced. The "reason code" can be thought of as a message forwarded along the path of normal instruction flow that identifies why a given stage has no work available. A unit will forward to subsequent stages in the instruction flow either instructions ready for the next phase of processing or a "reason" why no instruction can be forwarded.

In support of this, the performance monitor control registers have new flag(s) to indicate whether the performance monitor counters are counting using a "normal selection code" or a "reason code." In one embodiment, the monitor increments the counter when a "reason code" of interest matches the "reason code" associated with completion stage of the oldest instruction.

The approach of the present invention is to propagate the "reason code" via instruction tags. This approach is novel in that the instruction tags are used not only for the case that a given unit contains instructions to be executed but also for the case that a unit has no instructions. In the case that there is no actual instruction (i.e. unit of work), the meaning of the tag is the "reason" information as to why there is no instruction flowing through the pipeline at any given cycle. The addition of a "reason code" associated with each instruction in the pipeline provides a means for keeping track of the pipeline state at any point in time. In particular, the "reason code" identifies the reasons that a given unit is starved for instructions. The "reason codes" provide valuable insight into the cause and impact of given conditions and in particular can identify more accurately the cause of stalls. For example, a data dependency might be caused by a load miss or by a divide that takes many cycles. The reason code distinguishes between these two cases. By counting the various "reason codes" that block completion, a mechanism is provided for identifying a cost of specific types of blockages.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention includes not only instruction tags, but also includes the "reason code" information as to why items are not flowing through the instruction pipeline at any given cycle. According to the pipeline concept, instructions are divided into small portions that are more easily handled. These portions conceptually flow from stage/unit to unit with each unit accomplishing some fraction of the overall action to be performed by the instruction. It is typical that an operational unit completes one operation from a class of operations per cycle. By adding a reason code associated with each instruction in the pipeline, the pipeline state at any point in time can be tracked.

There are three interesting outcomes of the operations undertaken on behalf of some instruction by a given operational unit in any specific cycle. The operational unit may have completed the required operation, the operational unit may need more time to complete the current operation, or the operational unit may lack some prerequisite resource needed to carry out the operation.

In the first case, the operational unit has completed the subject operation and is free to carry out another operation. In the case that the operation embodies some result that will be required by some subsequent stage in the pipeline stage, the operational unit in question is ready to forward such a result to that stage requiring the result and will generally forward the result if the next operational element is itself able to accept a next operation/result. In is important to understand that the "result" produced by an operational unit is not necessarily a data value in the sense of arithmetic results; the "result" may just as well be the completion of the operation of concern. Hence, any operation can be considered to produce "results" and the forwarding of such "results" to subsequent operational units can be thought of as pipeline flow.

In the second case, the operational unit has not completed the required operation and requires more time (usually additional cycles) to complete the required operation. In this case, the conceptual flow of results is blocked. So, in a significant number of cases, the pipeline flow is block in those cycles when an operational unit cannot pass "results" to a subsequent unit for which the preceding units "results" are prerequisite. An example is in the case that an operational unit is responsible for computing the address of a required datum in the memory hierarchy; generally, the subsequent memory access operational unit requires the address of the datum in order to access the datum, so in this and other cases, a delay on the part of a given operational unit impacts the progress of subsequent units by causing subsequent units to become idle.

A key point in this example of the second case is that a delay in the calculation of the address of a needed datum will cause a subsequent unit to become idle only if the subsequent operational unit is itself able to accept new operations. If the subsequent unit is not able to accept new operations and results, then delay of this example is effectively hidden.

The third case is where an operational unit is ready and able to accomplish the required operation but cannot because of a missing prerequisite. An example is when a memory access unit cannot obtain a datum until it has the address of the datum. When an operational unit lacks some prerequisite such as the address of a datum, the operational unit will not be able to propagate results to any subsequent operational unit. Cases in which the failure of operational units to produce results for subsequent operational units that in turn cause the subsequent units to become idle can lead to cascades of idle units. Such cascaded idle units are commonly termed "pipeline bubbles" owing to the analogy of fluid flow in pipes. A cycle in which a final stage produces only a bubble is a cycle in which an idle condition is exposed. A purpose of this invention is to use the "bubbles" in a meaningful way. The reason codes are used to enable a "pipeline bubble" to account for its source and cause by requiring that a unit which originates a "pipeline bubble" to "color" the "pipeline bubble" by producing a "reason" for not producing a result.

Following the analogy of a pipeline propagating "bubbles," if a unit is idle because an upstream unit did not produce a result, the idled unit will have received a forwarded "colored bubble" from an upstream unit and will in turn forward the "reason" to any downstream dependent units depending on the given unit's "results". A subsequent element distinguishes between a "result" and a "reason" by means of the provided flag that is forwarded along with the "result" or "reason." Again, the analogy of pipes propagating "colored bubbles" is useful in understanding this. The effect of the forwarding is continued from unit to unit in the direction of the flow until the flow arrives at the final stage (typically the "completion" unit).

Using the "colored bubble" analogy, it is apparent from the discussion that one can account for idle conditions by observing the bubbles that emerge from final units, this opens the way for many easily implemented accounting schemes. One possible implementation would use the numeric value of the "reason code" representing the "pipeline bubble" as an index into a table of counters thus incrementing a counter that uniquely associates a unit and stall causing condition. An alternative implementation would utilize one or more selector fields coupled with a comparison circuit. If the "reason code" corresponding to the "pipeline bubble" matches the programmable selector value, then an appropriate counter would increment.

The reason codes provide valuable insight into the cause and impact of a given condition. For example, a data dependency might be caused by a load miss or by a divide that takes many cycles. The reason code distinguishes between these two cases. By counting different reason codes that hold up completion, the exact cause of specific types of blockages can be identified.

To provide a different perspective of the present invention, an analogy can be made to a conveyor belt in an assembly line. In this analogy, the "pipeline flow" described above is analogous to the flow of manufactured goods down a assembly line conveyor belt. In this idealized assembly line, in each "unit" of time, an object is moved to a closer state of completion by an operation such as the addition of a component (e.g., installing a windshield on a car). When such an assembly operation completes, the object proceeds down the conveyor belt to the next station. If a given station cannot complete the assembly operation required of it, the station can generally not allow the object to proceed to the next phase of assembly. There will typically be only a limited number of valid reasons for a station to not complete an operation. If failures to complete operations that cause net losses in the assembly line output are required, the station might send a note down the conveyor belt to indicate the reason that the station did not complete its operation. Regardless of the reason that the station cannot complete the operation, whether because of internal reasons or because it lacks some resource, it forwards that reason down the conveyor belt.

Alternatively, if the reason is because there is no incoming work (the previous station did not provide a next object to operate on) then the station will have received a note with a reason from the immediately previous station. This note is propagated to the next station via the conveyor belt. It is important to consider the case in which a station cannot complete an operation because of an internal reason and because of an external reason (i.e., no incoming object to operate on). In this case, the external reason should be chosen as the predominate reason. If there is no incoming work to be done, the fact that the work can otherwise not be done is irrelevant.

An important case occurs when multiple external resources are required to complete a given operation and more than one resource is not available. If the reason is from the longest missing resource (the first resource among the several that become unavailable) then the earliest arriving reason should be chosen since later reasons are not predominate. Thus, the later reasons are effectively "hidden" by the older reasons. For example, if a cache miss is detected that requires the start of a bus operation at a time when the bus operation cannot start, the proper cause would be the earliest reason. In this case, the cache miss is the predominant reason, since the bus operation is a direct consequence of the cache miss.

The above roughly describes the process that is followed at each and every station along the conveyor belt. Clearly, either reasons or objects will propagate down the conveyor belt until they arrive at the final station where the completed objects are collected.

At this final station, an "accountant" observes the dynamics of the assembly line. The "accountant" not only keeps track of completed objects that arrive (one per time "unit" or time "slot"), but also keeps track of time "slots" in which a completed object did not arrive.

In those time "slots" when an object was not produced, a reason will instead arrive. The reason can be applied to a running count for that reason category. In this way, one can pinpoint stalled stations along the conveyor belt/assembly line.

An interesting case occurs when a variety of resources are required for the final station to complete. This may occur when a given object requires more than one sub-assembly to be completed. For example, consider the case of several production lines that produce perhaps entirely different objects that are placed on pallets for shipping. If the rule governing the shipment of a pallet is such that an incomplete pallet cannot be shipped, then a pallet might be stalled on two reasons (each from a different assembly line). In this case, it is appropriate to count both reasons.

In a variation of the above, the final operation can be thought of as a shipping operation where a shipping container is envisioned which are packed in LIFO (last-in-first-out) order with objects to be shipped (e.g., a delivery van that is very long but with only a single rear door). In this viewpoint a shipping rule is expected in which there is a predetermined order in which the objects from the assembly lines may be packed (e.g., it may be that each shipping container is sent on a delivery route such that each stop on the route removes an object in the reverse order of the filling of the container).

In the ordered case, it is clear that the proper way to account for a stalled container is by looking at the first missing object from the sequence of objects that are to be packed. The reason associated with the first missing object is most relevant since it is the most urgently required object. When the first most missing object in the container is provided by the assembly lines, the previous second most missing object (if any) becomes the first most. The process of accounting is thus carried out for each of the "missing" objects until all have arrived. This analogy matches most closely with processors that have completion stages that insure that instructions are finished or completed in a particular order (i.e. in program order). While it may be allowable to execute instructions in various orders, the final process of completion may be completed in program order. So the assembly line is associated with the logic path interconnecting the processor pipeline stages while the final station is the processor completion unit and the LIFO shipping containers of a fixed size represent the completion windows of the microprocessor where four instructions may complete. Note, the present invention is applicable to systems that complete more or less than four instructions.

In this viewpoint, if only the first two of a given window of four are finished, then the third instruction in program order would provide the reason for why the completion finished only two instructions. The "reason" associated with a later instruction that also is not finished is not important until the later instruction becomes the first instruction in program order. For example, suppose that the first two instructions in a given completion window are both finished but the third instruction (is a divide which is still in progress) and the fourth instruction (is a load with a cache miss) are not complete.

The appropriate reason for the failure to complete two instructions is the divide stall. The cache miss will either finish before the divide does and complete along with the divide or not complete and be counted as the next first stalled instruction. If the cache miss finishes first, then it has successfully hidden behind the divide stall and should not be counted. If the cache miss finishes after the divide, then the cache miss is the exposed source of the stall and must be counted as the cause of the stall. Final counts of the number of stall cycles should statistically distribute across the various stall reasons, since a given operation cannot be expected to be "hidden" at every opportunity.

One other interesting example is where the entire completion buffer is purged due to a miss-predicted branch. In the cycle following the purge, there are no instructions in the completion buffer and the reason code should be due to an incorrectly predicted branch.

By post-processing the "sample states," the present invention can make a detailed determination of the types and frequencies of the different types of bottlenecks. Since the total pipeline state is captured at completion, the causes obstructing completion can be observed. Because the SIAR register implemented with a performance monitor identifies the code which corresponds to the instruction holding up completion, via repeated sampling an accurate picture can be obtained of the typical stalling reason code for those "hot spots" that show up many times in the sampling. By grouping together the samples for a specific "hot spot," an analysis of the state of the machine can be made. It can be determined, for example, that the blockage is caused by a specific cache miss, which can be alleviated by using a touch or otherwise causing the data to be read in early. If the analysis shows that there is speculative execution that is on the wrong path that is blocking the execution of the good path, the code may be updated to avoid this undesirable effect.

Figure 1:
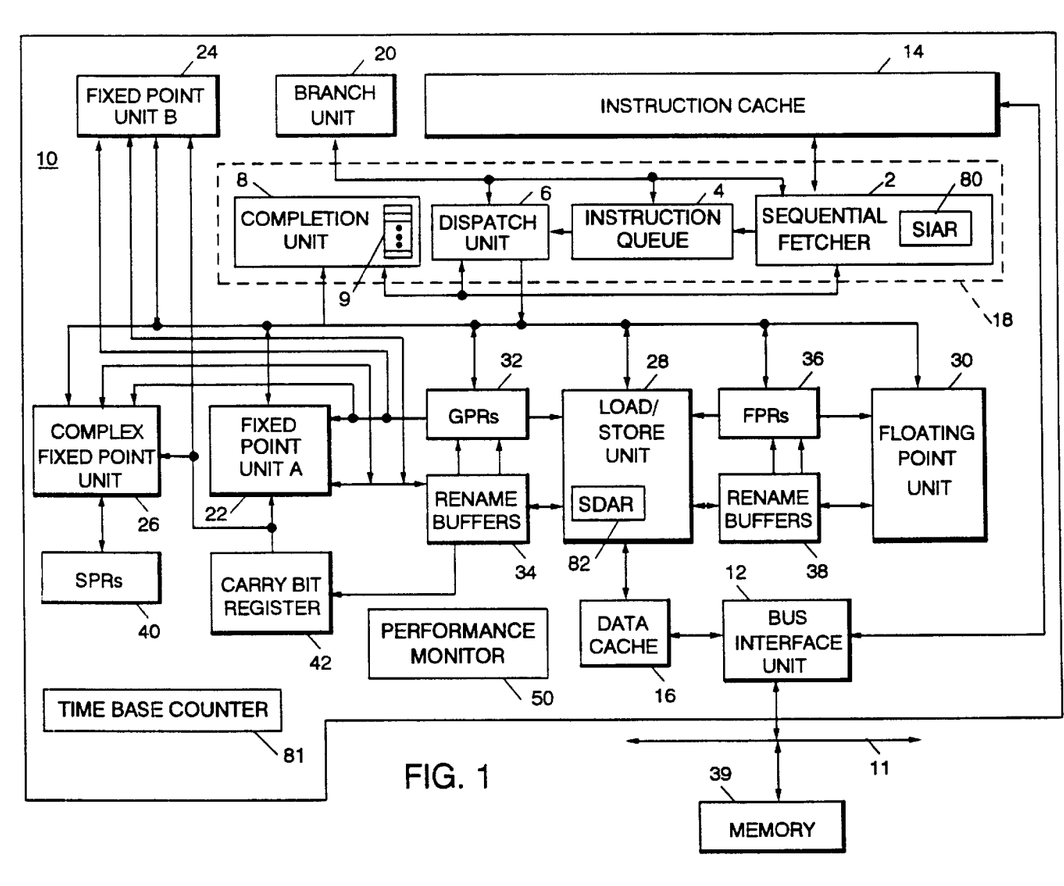
FIG. 1 illustrates a data processing system with which the system and method of the present invention may advantageously be utilized.

With reference now to the figures and in particular with reference to FIG. 1, there is depicted a block diagram of an illustrative embodiment of a processor 10 in accordance with the invention recited within the appended claims. In the depicted illustrative embodiment, processor 10 comprises a single integrated circuit pipelined superscalar microprocessor. Accordingly, as discussed further below, processor 10 includes various execution units, registers, buffers, memories, and other functional units, which are all formed from integrated circuitry. Processor 10 may comprise one of the PowerPC™ line of microprocessors available from IBM Microelectronics (e.g., the PowerPC™ 604), which operate according to reduced instruction set computing (RISC) techniques. Details concerning the architecture and operation of the PowerPC™ 604 processor may be found in the PowerPC™ 604 RISC Microprocessor User's Manual (available from IBM Microelectronics as Order No. MPR604UMU-01), which is incorporated herein by reference. Those skilled in the art should appreciate from the following description, however, that the present invention could alternatively be incorporated within other suitable processors.

As illustrated in FIG. 1, processor 10 is coupled to system bus 11 via bus interface unit (BIU) 12. BIU 12 controls the transfer of information between processor 10 and other devices (e.g., memory 39 or another processor) that are coupled to system bus 11 and that together with processor 10 and system bus 11 form a data processing system. BIU 12 is further connected to instruction cache 14 and data cache 16, which permit processor 10 to achieve relatively fast access times to a small set of local data and instructions stored within caches 14 and 16.

Instruction cache 14 is in turn connected to sequencer unit 18, which comprises sequential fetcher 2, instruction queue 4, dispatch unit 6, and completion unit 8. Sequential fetcher 2 fetches up to four instructions per cycle from instruction cache 14 and transmits the fetched instructions to both branch processing unit (BPU) 20 and instruction queue 4, which holds up to 8 instructions. Branch instructions are retained by BPU 20 for execution and are cancelled from instruction queue 4; sequential instructions, on the other hand, are cancelled from BPU 20 and temporarily buffered within instruction queue 4 for subsequent execution by sequential instruction execution circuitry within processor 10. Dispatch unit 6 dispatches up to four instructions per cycle from instruction queue 4 to the sequential instruction execution circuitry of processor 10 depending upon the availability of execution resources. One of the execution resources required for the dispatch of an instruction is an available entry in 16-entry reorder buffer 9 within completion unit 8. As described in greater detail below, reorder buffer 9 is utilized by completion unit 8 to retire instructions, which are opportunistically executed out of program order, according to program order.

In the depicted illustrative embodiment, the sequential instruction execution circuitry of processor 10 includes fixed-point unit A (FXUA) 22, fixed-point unit B (FXUB) 24, complex fixed-point unit (CFXU) 26, load/store unit (LSU) 28, and floating-point unit (FPU) 30. Each of these execution units is capable of executing one or more instructions of a particular class of instructions during each cycle. For example, FXUA 22 and FXUB 24 execute a first class of fixed-point instructions that perform mathematical and logical operations such as addition, subtraction, ANDing, ORing, and XORing; CFXU 26 executes a second class of fixed-point instructions that perform operations such as fixed-point multiplication and division; FPU 30 executes floating-point instructions that perform operations such as floating-point multiplication and division; LSU 28 executes load and store instructions; and branch unit 20 executes branch instructions.

Processor 10 achieves high performance by simultaneously processing multiple instructions at a number of pipeline stages within execution units 20–30. In this pipelined architecture, each instruction is processed in a sequence of stages, where processing at each stage is performed in parallel with the processing of other instructions at different stages. In the depicted illustrative embodiment, an instruction is normally processed at six stages: fetch, decode, dispatch, execute, completion, and writeback.

During the fetch stage, sequential fetcher 2 selectively fetches one or more instructions from one or more memory addresses within instruction cache 14. Each of the fetched instructions is then preferably associated with a unique instruction identifier (ID) by sequential fetcher 2.

Thereafter, during the decode stage, branch unit 20 partially decodes instructions forwarded to it by sequential fetcher 2 in order to discriminate between sequential and branch instructions. In addition, an implementation-dependent number of the sequential instructions within instruction queue 4 are decoded in parallel by dispatch unit 6.

In the dispatch stage, dispatch unit 6 selectively dispatches up to four decoded instructions to appropriate ones of execution units 20–30 in program order after first reserving entries within rename buffers 34 and 38 for the dispatched instructions, results and reserving one entry in reorder buffer 9 for each dispatched instruction. During the dispatch stage, operands for the dispatched instructions are also supplied to the selected execution units. For example, FPU 30 can retrieve instruction operands from floating-point registers (FPRs) 36 and floating-point rename buffers 38. Fixed-point execution units 22, 24, and 26, on the other hand, can retrieve instruction operands from general purpose registers (GPRs) 32, fixed-point rename buffers 34, and carry bit register 42. CFXU 26 can also obtain instruction operands from special purpose registers (SPRs) 40 in response to receipt of MFSPR (move from SPR) instruction. LSU 28 retrieves data from a selected one of GPRs 32 and FPRs 36 in response to receipt of a STORE instruction and requests data operands from data cache 16 in response to receipt of a LOAD instruction from dispatch unit 6. If LOAD operand data requested by LSU 28 is not resident within data cache 16, the requested data is retrieved from memory 39 (or other external source) via BIU 12 and system bus 11.

In the execute stage, execution units 20–30 opportunistically execute their respective dispatched instructions as operands become available, thereby permitting instructions to be executed out-of-order relative to their program order. The execution results of most instructions are stored in the entry or entries within fixed-point rename buffers 34 and floating-point rename buffers 38 allocated to each instruction by sequencer unit 18. In addition, CFXU 26 stores the execution results of MTSPR (move to SPR) instructions in SPRs 40 or other SPRs in processor 10.

In the completion stage, completion unit 8 indicates that an instruction is complete when execution of the instruction is finished and preceding instructions have been completed or will be completed during the same cycle. Thereafter, during the writeback stage, completion unit 8 directs the copying of data from fixed-point rename buffers 23 to GPRs 22 or from floating-point rename buffers 26 to FPRs 25. It is during the writeback stage that processor 10 updates its architected state in response to the instruction being written back. Processor 10 processes the respective writeback stages of instructions according to program order and advantageously merges an instruction's completion and writeback stages in specified situations. In the illustrative embodiment, each instruction requires one machine cycle to complete each of the stages of instruction processing. Nevertheless, some instructions, such as complex fixed-point instructions, may require more than one cycle. Accordingly, a variable delay may occur between a particular instruction's execution and completion stages in response to the variation in time required for completion of preceding instructions.

Still referring to FIG. 1, the hereinbefore described operation of processor 10 can be monitored utilizing performance monitor 50, which in the illustrative embodiment is a software-accessible mechanism capable of providing detailed information descriptive of the utilization of instruction execution resources and storage control. Although not illustrated in FIG. 1, performance monitor 50 is coupled to each functional unit of processor 10 in order to permit the monitoring of all aspects of the operation of processor 10, including reconstructing the relationship between events, identifying false triggering, identifying performance bottlenecks, monitoring pipeline stalls, monitoring idle cycles, determining dispatch efficiency, determining branch efficiency, determining the performance penalty of misaligned data accesses, identifying the frequency of execution of serialization instructions, identifying inhibited interrupts, and determining performance efficiency.

Figure 4:
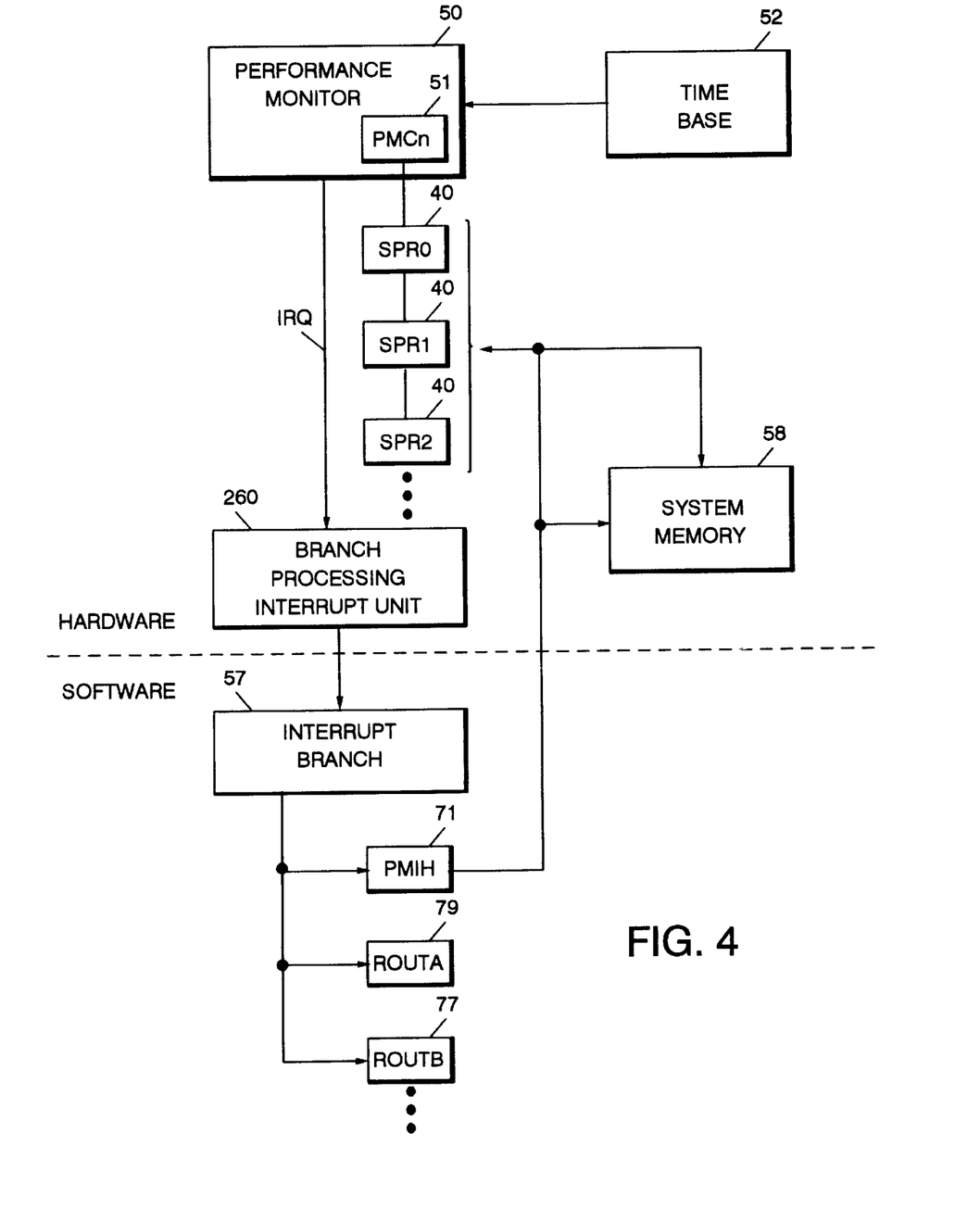
FIG. 4 is a block diagram of a performance monitoring aspect of the present invention.
Figure 7:
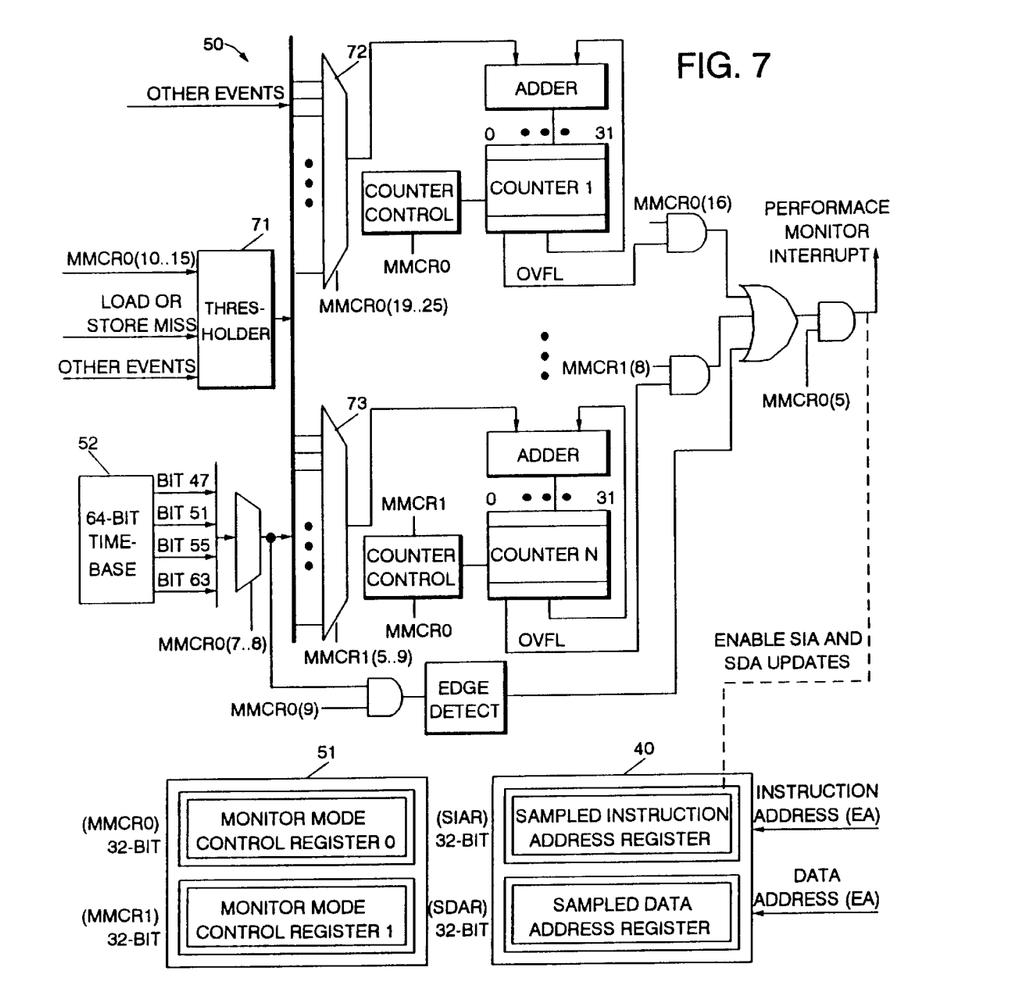
FIG. 7 illustrates a block diagram of a performance monitor configured in accordance with the present invention.

Referring to FIGS. 4 and 7, a feature of processor 10 is performance monitor (PM) 50. Performance monitor 50 is a software-accessible mechanism intended to provide detailed information with significant granularity concerning the utilization of PowerPC instruction execution and storage control. Generally, the performance monitor 50 includes an implementation-dependent number (e.g., 2–8) of counters 51, e.g, PMC1–PMC8, used to count processor/storage related events. Further included in performance monitor 50 are monitor mode control registers (MMCRn) that establish the function of the counters PMCn, with each MMCR usually controlling some number of counters. Counters PMCn and registers MMCRn are typically special purpose registers physically residing on the processor 10, e.g., a PowerPC. These special purpose registers are accessible for read or write via mfspr (move from special purpose register) and mtspr (move to special purpose register) instructions, where the writing operation is allowed in a privileged or supervisor state, while reading is allowed in a problem state since reading the special purpose registers does not change the register's content. In a different embodiment, these registers may be accessible by other means such as addresses in I/O space. The MMCRn registers are partitioned into bit fields that allow for event/signal selection to be recorded/counted. Selection of an allowable combination of events causes the counters to operate concurrently.

The MMCRn registers include controls, such as counter enable control, counter negative interrupt controls, counter event selection, and counter freeze controls, with an implementation-dependent number of events that are selectable for counting. Smaller or larger counters and registers may be utilized to correspond to a particular processor and bus architecture or an intended application, so that a different number of special purpose registers for MMCRn and PMCn may be utilized without departing from the spirit and scope of the present invention.

The performance monitor 50 is provided in conjunction with a time base facility 52 which includes a counter that designates a precise point in time for saving the machine state. The time base facility 52 includes a clock with a frequency that is typically based upon the system bus clock and is a required feature of a superscalar processor system including multiple processors 10 to provide a synchronized time base. The time base clock frequency is provided at the frequency of the system bus clock or some fraction, e.g., ¼, of the system bus clock.

Predetermined bits within a 64-bit counter included in the time base facility 52 are selected for monitoring such that the increment of time between monitored bit flips can be controlled. Synchronization of the time base facility 52 allows all processors in a multiprocessor system to initiate operation in synchronization. Examples of methods for performing such synchronization are provided in co-pending U.S. patent application Ser. No. 08/675,427, entitled "Performance Monitoring in a Multiprocessor System With Interrupt Masking", assigned to an assignee of the present invention and incorporated herein by reference in its entirety.

Figure 5:
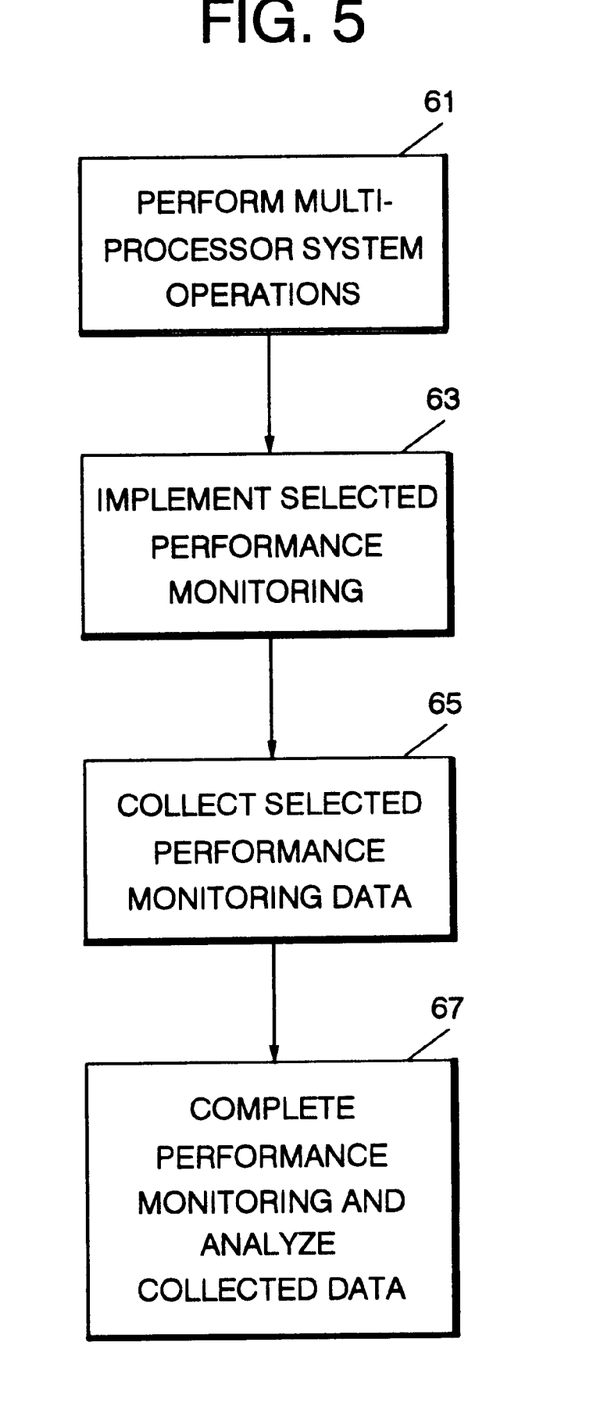
FIG. 5 is a block diagram of an overall process flow in accordance with the present invention of processing system operation including performance monitoring.

Time base facility 52 further provides a method of tracking events occurring simultaneously on each processor of a multiprocessor system. Since the time base facility 52 provides a simple method for synchronizing the processors, all of the processors of a multiprocessor system detect and react to a selected single system-wide event in a synchronous manner. The transition of any bit or a selected one of a group of bits may be used for counting a condition among multiple processors simultaneously such that an interrupt is signalled when a bit flips or when a counted number of events has occurred. In operation, a notification signal is sent to PM 50 from time base facility 52 when a predetermined bit is flipped. The PM 50 then saves the machine state values in special purpose registers. In a different scenario, the PM 50 uses a "performance monitor" interrupt signalled by a negative counter (bit zero on) condition. The act of presenting the state information including operand and address data may be delayed if one of the processors has disabled interrupt handling. In order to ensure that there is no loss of data due to interrupt masking, when the interrupt condition is signaled, the processors capture the effective instruction and operand (if any) addresses of "an" instruction in execution and present an interrupt to the interrupt resolution logic 57, which employs various interrupt handling routines 71, 77, 79. These addresses are saved in registers, Saved Data Address (SDAR) and Saved Instruction Address (SIAR), which are designated for these purposes at the time of the system-wide signaling. The state of various execution units are also saved. This state of various execution units at the time the interrupt is signalled is provided in a saved state register (SSR). This SSR could be an internal register or a software accessible SPR. Thus, when the interrupt is actually serviced, the content of these registers provide the information concerning current instructions that are currently executing in the processor at the time of the signaling. When the PM 50 receives the notification from time base 52 to indicate that it should record "sample data", an interrupt signal is output to a branch processing unit 20. Concurrently, the sample data (machine state data) is placed in SPRs 40 including the SIAR, SDAR and SSR which are suitably provided as registers or addresses in I/O space. A flag may be used to indicate interrupt signalling according to a chosen bit transition as defined in the MMCRn. Of course, the actual implementation of the time base facility 52 and the selected bits is a function of the system and processor implementation. A block diagram, as shown in FIG. 5, illustrates an overall process flow in accordance with the present invention of a superscalar processor system operation including performance monitoring. The process begins in block 61 with the processing of instructions within the superscalar processor system. During the superscalar processor system operation, performance monitoring is implemented in a selected manner via block 63 through configuration of the performance monitor counters by the monitor mode control registers and performance monitoring data is collected via block 65.

By adjusting the values of the performance monitor counts, that is by setting the values of the counters high enough so that an exception is signalled by some predetermined number of occurrences of an event, a profile of system performance can be obtained. Further, for purposes of this disclosure, a performance monitoring interrupt may occur at a selectable point in the processing. As described in more detail below, a predetermined number of events is suitably used to select the stop point. For example, counting can be programmed to end after two instructions by causing the counter to go negative after the completion of two instructions. Further, for purposes of this disclosure, the time period during which monitoring occurs is known. Thus, the data collected has a context in terms of the number of minutes, hours, days, etc. over which the monitoring is performed. As described herein below, selected performance monitoring may include reconstructing a relationship among events, identifying false triggering, identifying bottlenecks, monitoring stalls, monitoring idles, determining the efficiency of operation of a dispatch unit, determining the effectiveness of branch unit operations, determining a performance penalty of misaligned data accesses, identifying a frequency of execution of serialization instructions, identifying inhibited interrupts, and applying Little's Law to identify efficiency.

Figure 6A:
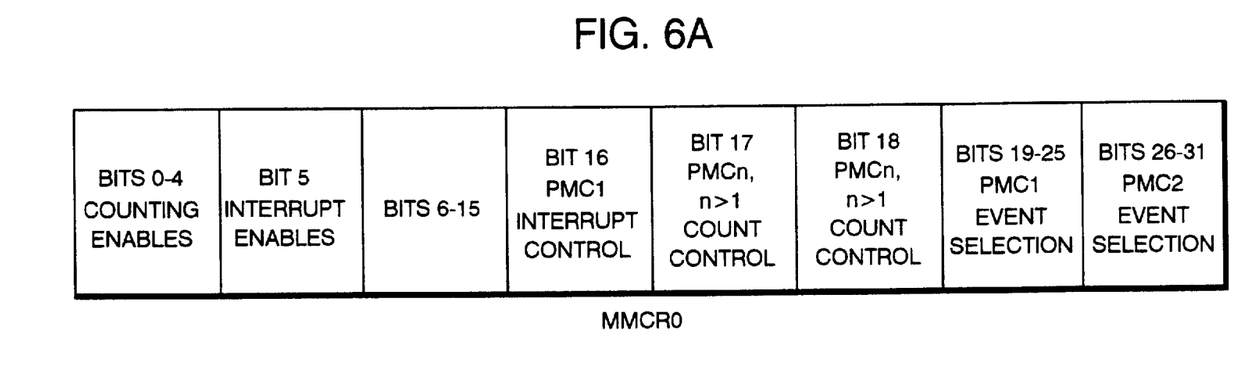
FIGS. 6A and 6B illustrate monitor control registers (MMCRn) utilized to manage a plurality of counters.

The selected performance monitoring routine is completed and the collected data is analyzed via block 67 to identify potential areas of system enhancements. A profiling mechanism, such as a histogram, may be constructed with the data gathered to identify particular areas in the software or hardware where performance may be improved. Further, for those events being monitored that are time sensitive, e.g., a number of stalls, idles, etc., the count number data is collected over a known number of elapsed cycles so that the data has a context in terms of a sampling period. It should be appreciated that analysis of collected data may be facilitated using such tools as "aixtrace" or a graphical performance visualization tool "pv", each of which is available from IBM Corporation. In FIG. 6a, an example representation of one configuration of MMCR0 suitable for controlling the operation of two PMC counters, e.g., PMC1 and PMC2, is illustrated. As shown in the example, MMCR0 is partitioned into a number of bit fields whose settings select events to be counted, enable performance monitor interrupts, specify the conditions under which counting is enabled, and set a threshold value (X).

The threshold value (X) is both variable and software selectable and its purpose is to allow characterization of certain data, such that by accumulating counts of accesses that exceed decreasing threshold values, designers gain a clearer picture of conflicts. The threshold value (X) is considered exceeded when a decrementer reaches zero before the data instruction completes. Conversely, the threshold value is not considered exceeded if the data instruction completes before the decrementer reaches zero; of course, depending on the data instruction being executed, "completed" has different meanings. For example, for a load instruction, "completed" indicates that the data associated with the instruction was received, while for a "store" instruction, "completed" indicates that the data was successfully written. A user readable counter, e.g., PMC1, suitably increments every time the threshold value is exceeded. A user may determine the number of times the threshold value is exceeded prior to the signalling of performance monitor interrupt. For example, the user may set initial values for the counters to cause an interrupt on the 100th data miss that exceeds the specified threshold. With the appropriate values, the PM facility is readily suitable for use in identifying system performance problems.

Referring to FIG. 6a, as illustrated by this example, bits 0–4 and 18 of the MMCR0 determine the scenarios under which counting is enabled. By way of example, bit 0 is a freeze counting bit (FC). When at a high logic level (FC=1), the values in PMCn counters are not changed by hardware events, i.e., counting is frozen. When bit 0 is at a low logic level (FC=0), the values of the PMCn can be changed by chosen hardware events. Bits 1–4 indicate other specific conditions under which counting is frozen.

For example, bit 1 is a freeze counting while in a supervisor state (FCS) bit, bit 2 is a freeze counting while in a problem state (FCP) bit, bit 3 is a freeze counting while PM=1 (FCPM1) bit, and bit 4 is a freeze counting while PM=0 (FCPM0) bit. PM represents the performance monitor marked bit, bit 29, of a machine state register (MSR) (SPR 40, FIG. 1). For bits 1 and 2, a supervisor or problem state is indicated by the logic level of the PR (privilege) bit of the MSR. The states for freezing counting with these bits are as follows: for bit 1, FCS=1 and PR=0; for bit 2, FCP=1 and PR=1; for bit 3, FCPM1=1 and PM=1; and for bit 4, FCPM0=1 and PM=0. The state for allowing counting with these bits are as for bit 1, FCS=1 and PR=1; for bit 2, FCP=1 and PR=0; for bit 3, FCPM1=1 and PM=0; and for bit 4, FCPM0=1 and PM=1. Bits 5, 16, and 17 are utilized to control interrupt signals triggered by PMCn. Bits 6–9 are utilized to control the time or event-based transitions. The threshold value (X) is variably set by bits 10–15. Bit 18 control counting enablement for PMCn, n>1, such that when low, counting is enabled, but when high, counting is disabled until bit 0 of PMC1 is high or a performance monitoring exception is signaled. Bits 19–25 are used for event selection, i.e, selection of signals to be counted, for PMC1.

Figure 6B:
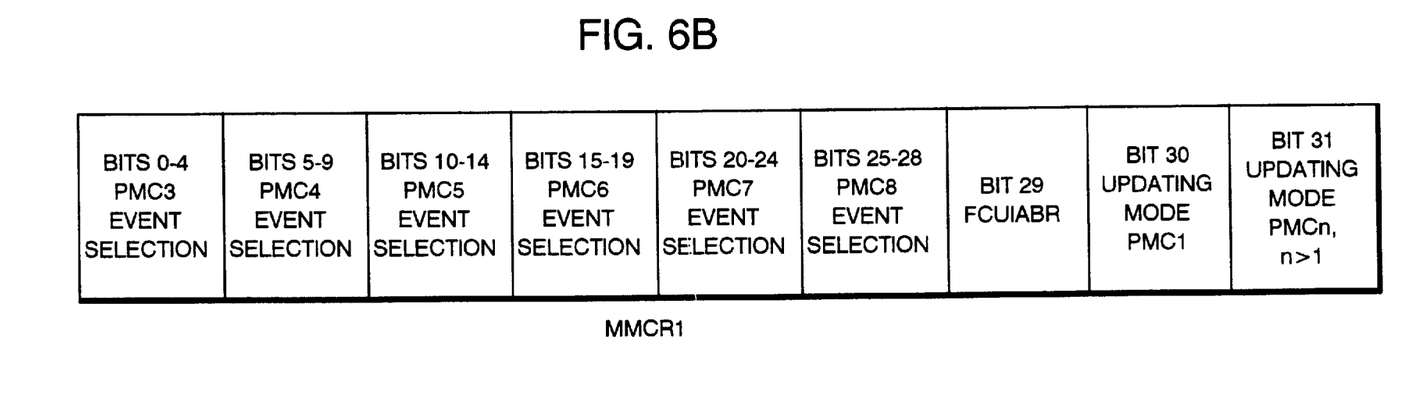

FIG. 6b illustrates a configuration of MMCR1 in accordance with an embodiment of the present invention. Bits 0–4 suitably control event selection for PMC3, while bits 5–9 control event selection for PMC4. Similarly, bits 10–14 control event selection for PMC5, bits 15–19 control event selection for PMC6, bits 20–24 control event selection for PMC7, and bits 25–28 control event selection for PMC8.

The counter selection fields, e.g., bits 19–25 and bits 26–31 of MMCR0 and bits 0–28 of MMCR1, preferably have as many bits necessary to specify the full domain of selectable events provided by a particular implementation.

At least one counter is required to capture data for performance analysis. More counters provide for faster and more accurate analysis. If the scenario is strictly repeatable, the same scenario may be executed with different items being selected. If the scenario is not strictly repeatable, then the same scenario may be run with the same item selected multiple times to collect statistical data. The time from the start of the scenario is assumed to be available via system time services so that intervals of time may be used to correlate the different samples and different events.

For further discussion of performance monitoring, please refer to Chapter 9, Performance Monitor, PowerPC 604 RISC Microprocessor User's Manual, pp. 9–1 through 9–11, IBM 1994, which is hereby incorporated by reference herein. In this reference, there are a couple of tables indicating code points for storage within the MMCRn registers, such as the registers illustrated in FIGS. 6a and 6b, which notify the various counters PMCn what events to monitor and in what fashion. Referring next to FIG. 7, there is illustrated an embodiment for implementing the present invention. FIG. 7 illustrates performance monitor 50 having a couple of MMCRn registers 51 shown, SIAR and SDAR registers 40, PMC1 . . . PMCn (noted as Counters 1 . . . N) with their associated adders and counter control logic being fed by multiplexer 72 . . . 73 controlled by various bits of the MMCRn registers. Multiplexer 72 . . . 73 receive events from thresholder 71, time base circuitry 52 and from other events, which are signals originating from various execution units and other units within the microprocessor. All of these various circuit elements of performance monitor 50 are discussed herein and in the cross-referenced patent applications indicated above, and therefore further detailed discussion into the operation of these elements is not provided.

The present invention centers on the requirement that programs are specified as ordered lists of non-idempotent operations and hence instruction streams executed by von Neumann style processors are carried out in program order. This constraint may perhaps not impact the manner in which the work within the CPU is actually done, but it does impact the manner in which the instructions are completed.

It is generally the case in software systems that the execution of the unit software operations (instructions) are performed in a particular order. There are exceptions of course, but by and large, software systems tend to be implemented as threads of ordered software operations. It is generally not allowable for the effects of these operations to become architecturally visible out of the program specified order.

For example, when counting items via a software system, one might need to obtain the current count value, update the value and replace the count value in its proper storage place. It would not serve the intended purpose of such a software system to carry out these operations out of order.

However, if one sets out to accomplish several unrelated software functions, it is often not necessary to carry out the fundamental software operations comprising the functions in a strict order across function boundaries (i.e., the order of the component operations of independent functions may be amenable to reordering). An important purpose and function of a superscalar processor is to identify in hardware such intertwined threads of otherwise unrelated execution.

Some CPU organizations are designed to be able to take advantage of the opportunity for reordering the execution of the fundamental steps by insuring that the overall apparent order of the execution of the software operations is preserved. The advantage of such CPU organizations is that delays due to obtaining values from memory can often be hidden, thus improving CPU performance.

However, this advantage in performance poses a disadvantage in measurement. Namely, the reordering of the fundamental software operations reduces the cost of long memory delays by allowing the access of memory values well in advance of the actual need. Therefore, it no longer suffices to simply measure the amount of time required to complete memory accesses; to do so will result in an over-counting of the penalty.

Most pipeline superscalar machines that support speculative execution have some type of pipeline control sequencer ("PCS"). Instructions are typically given some type of tag or identification number by the PCS or an instruction dispatcher component. The instruction is referred to by this assigned tag as the instruction passes through the pipeline. These tags are usually short and only have enough bits to reflect the maximum number of instructions that can be in the pipeline at one time. U.S. patent application Ser. No. 08/888,798, which is hereby incorporated by reference herein, discloses a pipeline flow table approach for capturing the state of the processor for software analysis. The present invention defines another approach for providing the capturing of the required information.

Figure 2:
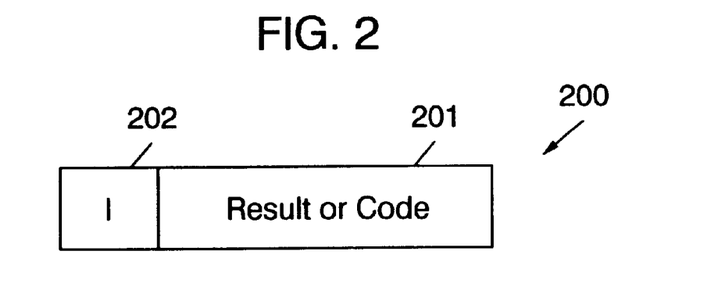
FIG. 2 illustrates a configuration of a register for implementing a reason code.
Figure 8:
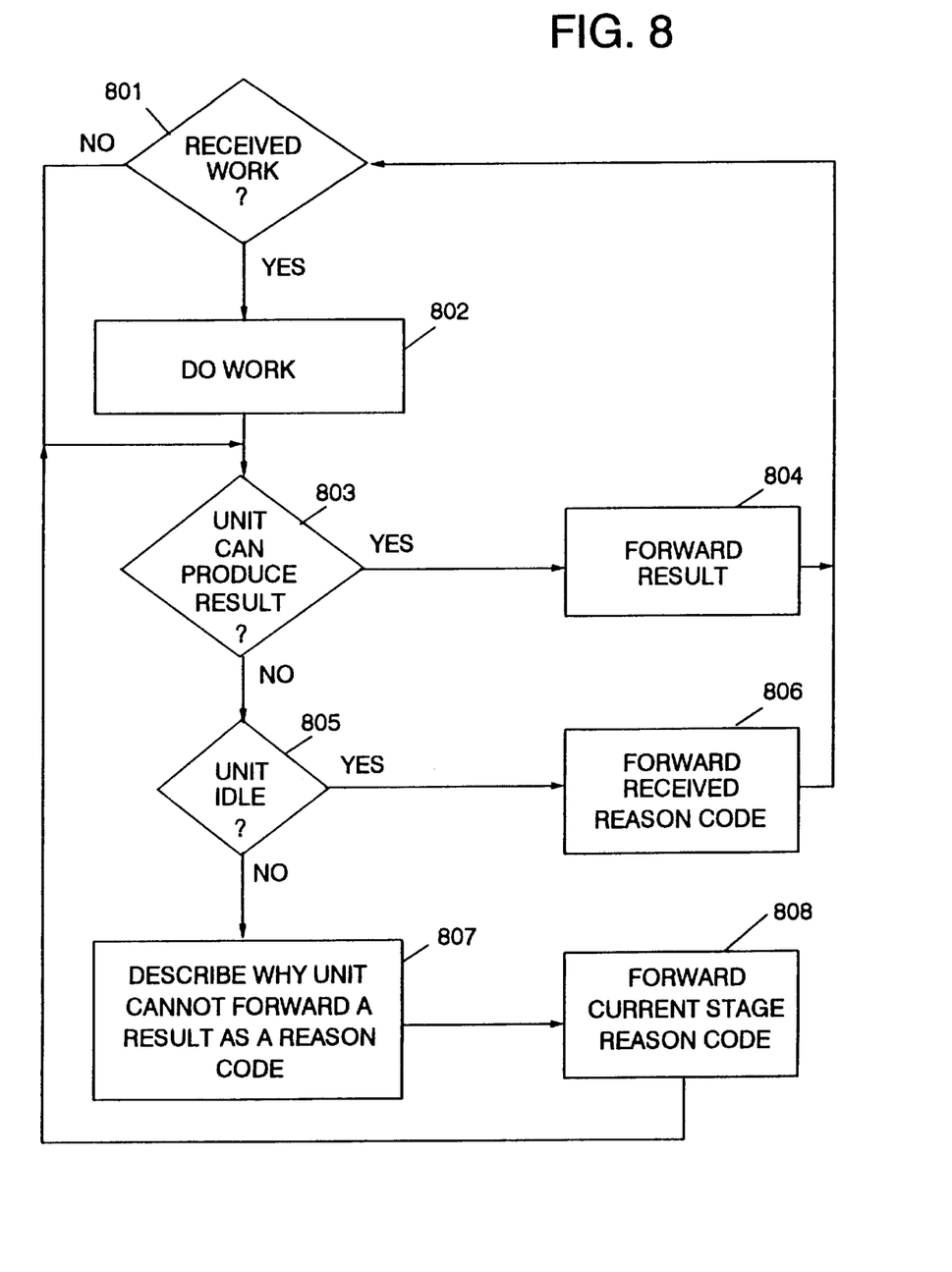
FIG. 8 illustrates a flow diagram in accordance with the present invention.

Referring next to FIG. 2, at each cycle, each unit within the processor 10 either produces a result or a reason code 201 and an indicator (I) 202, which is stored in registers 200 within each of the units and then eventually collected in registers 9 in completion unit 8. Referring to FIG. 8, there is illustrated a flow diagram in accordance with the present invention. In step 801, a determination is made whether a unit receives an instruction (unit of work) from a previous unit. A reason code is always received. A null code is received when work is received. In step 802, the present unit attempts to work on the instruction. In step 803, a determination is made whether or not the unit can produce a result. If yes, the result is forwarded in step 804 and the process returns to step 801 to receive the next unit of work in the next cycle. If in step 803, the unit cannot produce a result, the process will proceed to step 805 to determine whether the unit is idle. If the unit is idle, then the process proceeds to step 806 to forward the reason code received from the previous unit. The process would then return to step 801 for the next cycle.

If, in step 805, the unit is not idle, then the process proceeds to step 807 to describe why the unit cannot produce a result, and to encode this description as a reason code and forward this reason code on to the next unit in step 808. The process then would return to step 803.

If, in step 801, work has not been received from the previous stage, then the process skips step 802.

The following example further explains the process illustrated in FIG. 8. In the example, there are three stages to consider: a dispatch unit for dispatching instructions, first and second execution units (e.g., a fixed point execution unit and a floating point execution unit) for executing instructions dispatched from the dispatch unit in parallel, and a completion unit. The dispatch unit will be considered to be the first stage, the first and second execution units will be considered to reside at the second stage, and the completion unit will be considered to reside at the third stage. The process illustrated at FIG. 8 will be described with respect to the first and second execution units in the second stage. If the dispatch unit is stalled, and unable to dispatch instructions, then the first execution unit, in step 801, will not receive work. The process will proceed to step 803 to determine whether or not the first execution unit can produce a result. In this example, the first execution unit is performing a divide operation, which takes several cycles. In this example, at step 803, the first execution unit has completed the divide operation and can produce a result. Therefore, this second stage unit will proceed to step 804 to forward the result of the divide operation to the completion unit.

The second execution unit, at step 803, is also performing an operation requiring several cycles, but is not yet able to produce a result. (Note, since the dispatch unit has stalled, the second execution unit has also received a reason code indicating so from the dispatch unit.)

The second execution unit will then proceed to step 805, wherein a determination is made whether or not the second execution unit is idle. In this case, the second execution unit is not idle, since it is performing an operation as described above. Therefore, the process will proceed to step 807, wherein a reason code is formulated encoding why the second execution unit cannot produce a result. This reason code will then be forwarded to the completion unit in step 808. The process will then return to step 803 in the next cycle to determine whether or not the second execution unit can now produce a result. Once the second execution unit can produce a result from its operation that it is executing, it will then forward that result in step 804.

If in this example, the second execution unit is not performing an operation in step 803, then in step 805, it will also be determined that the execution unit is idle and the process will proceed to step 806 to forward the reason code received from the dispatch unit.

If in this example, the dispatch unit is able to dispatch instructions (work), then in step 802, whichever execution unit received the instruction will attempt to perform the instruction. If, in step 803, the execution unit can produce a result, it will forward this result in step 804. If the execution unit cannot produce a result, then the process will proceed to step 805. If the execution unit is still operating on the instruction, and is therefore not idle, the process will proceed to step 807 where the execution unit will formulate a reason code why it cannot produce a result within that clock cycle (in this case, it is still operating on the instruction), and will forward that reason code in step 808. The process will return to step 803 to determine again whether or not the execution unit can now produce a result in the next clock cycle.

Figure 3:
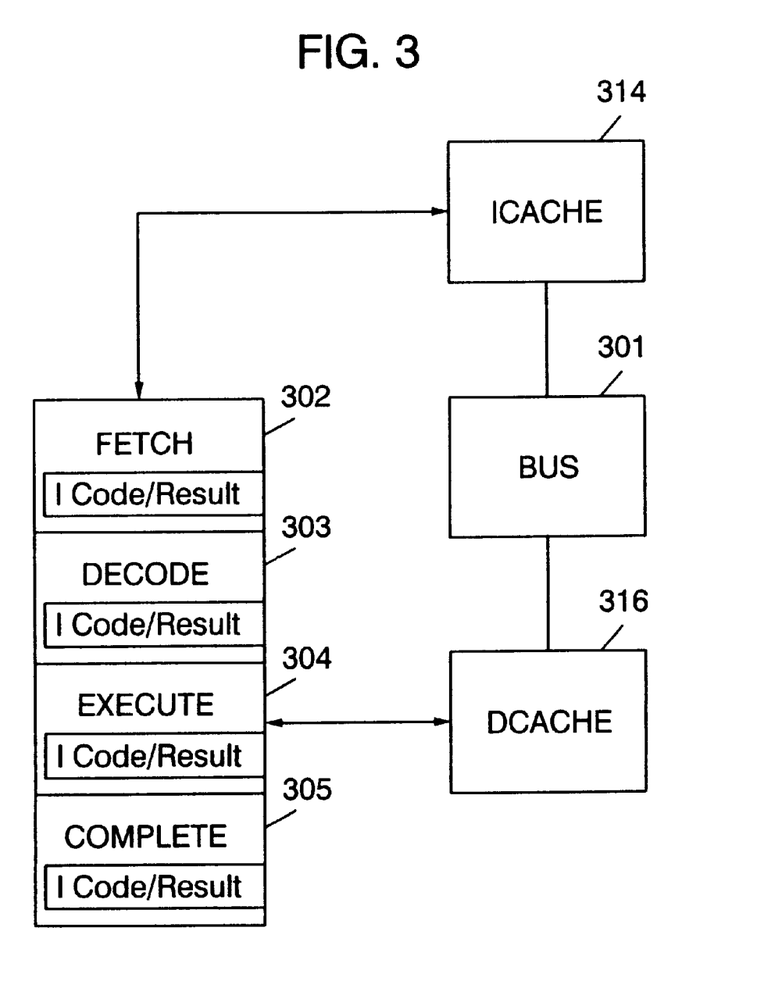
FIG. 3 illustrates a simplified pipelined processor implementing an embodiment of the present invention.

Referring to FIG. 3, there is illustrated a simplified diagram of a pipelined processor wherein at the fetch 302, decode 303, execute 304, and complete 305 stages, the result or reason code illustrated in FIG. 2 is generated and passed to the subsequent unit. If a reason code is generated, then the subsequent units will be unable to generate a result, since they will have no result from the previous unit to work on. These subsequent units will also not generate their own reason, if there is one, but will merely pass the reason code received from the previous unit to the subsequent unit. At the complete stage 305, one or more of the performance monitor counters (see FIG. 7) can be implemented to count the number of times a certain reason has been received. This can be done with an indexable counter or a comparator, which compares an observed reason at the completion stage 305 with a predetermined reason stored within a register. Furthermore, using the PMI feature of the performance monitor, an interrupt can be generated upon the occurrence of a certain counted number of reasons or upon the occurrence of a particular reason, which can then result in the storage of the state of the processor within the SIAR 80 and SDAR 82.

As a result, instead of counting at two or more of the stages 302–305 and then making a post-processing comparison of stall conditions, counting only need be done at the completion stage 305, which provides an indication where the stall has occurred within stages 302–305 with less necessary post-processing of the performance monitor output. Although the present invention and its advantages have been described in detail, it should be understood that various changes, substitutions and alterations can be made herein without departing from the spirit and scope of the invention as defined by the appended claims.

What is claimed is:

1. A circuit comprising:

first and second sequential stages operable for processing an instruction;

circuitry operable for attempting to process the instruction at the first stage;

circuitry operable for generating a first reason code at the first stage if the first stage is unable to process the instruction, wherein the first reason code indicates why the first stage could not process the instruction;

circuitry operable for forwarding the first reason code from the first stage to the second stage;

circuitry operable for creating a second reason code at the second stage indicating an operational state of the second stage; and circuitry operable for forwarding by the second stage to a third stage either the first reason code or the second reason code.

2. The circuit as recited in claim 1, further comprising:

a performance monitor counter operable for performing a counting function as a function of the reason code received at the third stage.

3. The circuit as recited in claim 2, wherein the counting function increments a counter if the reason code matches a predetermined reason code.

4. The circuit as recited in claim 1, wherein the second stage forwards the first reason code to the third stage when the second stage cannot produce a result and is idle.

5. The circuit as recited in claim 1, further comprising circuitry for identifying the instruction causing the second stage to produce the second reason code.

6. The circuit as recited in claim 1, further comprising:

circuitry operable for attempting to process the instruction at the second stage; and circuitry operable for forwarding the second reason code to third stage when the second stage is unable to produce a result.

7. A method comprising the steps of:

attempting to process an instruction in a first stage;

generating a first reason code at the first stage if the first stage is unable to process the instruction, wherein the first reason code indicates why the first stage could not process the instruction;

transferring the first reason code from the first stage to a second stage; and either transferring the first reason code received by the second stage to a third stage subsequent to the second stage or creating a second reason code why the second stage cannot produce a result and forwarding the second reason code to the third stage.

8. The method as recited in claim 7, further comprising the step of identifying and outputting the instruction causing a reason code.

9. The method as recited in claim 7, further comprising the step of:

performing a counting function as a function of the reason code received at the third stage.

10. The method as recited in claim 7, wherein the second stage transfers the first reason code to the third stage when the second stage is idle and cannot produce a result.

11. The method as recited in claim 7, further comprising the steps of the second stage producing a result and forwarding the result to the third stage even when the second stage has received the first reason code.

12. A processor comprising:

first, second, and third sequential stages operable for processing an instruction;

circuitry operable for attempting to process the instruction at the first stage;

circuitry operable for either producing a first result of the processing of the instruction at the first stage or generating a first reason code at the first stage if the first stage is unable to process the instruction, wherein the first reason code indicates why the first stage could not process the instruction;

circuitry operable for transferring either the first result or the first reason code from the first stage to the second stage;

circuitry operable for attempting to process the instruction at the second stage when the first result is received;

circuitry operable for either producing a second result of the processing of the instruction at the second stage or generating a second reason code at the second stage if the second stage is unable to process the instruction, wherein the second reason code indicates why the second stage could not process the instruction;

circuitry operable for transferring the first reason code received from the first stage to a third stage subsequent to the second stage if the second stage received the first reason code from the first stage and the second stage is idle; and circuitry operable for transferring the second reason code to the third stage subsequent to the second stage if the second stage was unable to process the first result.

13. The processor as recited in claim 12, wherein the third stage is a completion stage.

14. The processor as recited in claim 12, wherein the third stage includes circuitry for accumulating reason codes.

* * * * *